(12) United States Patent
Bergkamp et al.

(10) Patent No.: US 9,220,200 B2
(45) Date of Patent: Dec. 29, 2015

(54) CONSTANT PRESSURE CONCAVE ASSEMBLY IN A COMBINE HARVESTER PROCESSING SYSTEM

(71) Applicant: AGCO Corporation, Duluth, GA (US)

(72) Inventors: Alan R. Bergkamp, Wichita, KS (US); Bernard D. Regier, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/359,452

(22) PCT Filed: Nov. 29, 2012

(86) PCT No.: PCT/US2012/066977
§ 371 (c)(1),
(2) Date: May 20, 2014

(87) PCT Pub. No.: WO2013/082236
PCT Pub. Date: Jun. 6, 2013

(65) Prior Publication Data
US 2014/0308998 A1    Oct. 16, 2014

Related U.S. Application Data

(60) Provisional application No. 61/564,708, filed on Nov. 29, 2011.

(51) Int. Cl.
*A01F 12/28* (2006.01)
(52) U.S. Cl.
CPC ...................................... *A01F 12/28* (2013.01)
(58) Field of Classification Search
CPC ......... A01F 12/28; A01F 12/24; A01F 12/26; A01F 12/181; A01D 75/182
USPC .................. 460/109, 107, 80, 62; 241/290
See application file for complete search history.

(56) References Cited

U.S. PATENT DOCUMENTS

| 740,215 | A | * | 9/1903 | Bartholow | .................... 460/109 |
| 1,095,693 | A | * | 5/1914 | Anderson | ..................... 460/109 |

(Continued)

FOREIGN PATENT DOCUMENTS

| EP | 092 599 A1 | 11/1983 | |
| JP | 2007252225 A | * 10/2007 | .............. A01F 12/00 |

OTHER PUBLICATIONS

International Search Report, International Application No. PCT/US2012/066977, completed Feb. 27, 2013, European Patent Office.

*Primary Examiner* — Árpád Fábián-Kovács

(57) ABSTRACT

A combine harvester has a crop processing rotor and a concave assembly having at least one concave extending at least partially beneath the rotor in a circumferential manner. The concave assembly is pivotable about pivot point to move the concave in a generally concentric manner toward and away from rotor. An operating mechanism pivots the concave assembly to adjust the operating clearance between the concave assembly and the rotor. The operating mechanism includes an actuator and a linkage assembly connecting the actuator to the concave assembly. The linkage assembly includes a hydraulic cylinder that applies a substantially constant force to the concave assembly to control the pressure put on the crop while the rotor is rotating. A hydraulic supply ports hydraulic fluid to the hydraulic cylinder. The combine harvester also has an accumulator located between the hydraulic supply and the hydraulic cylinder.

5 Claims, 3 Drawing Sheets

(56) References Cited

U.S. PATENT DOCUMENTS

| | | | |
|---|---|---|---|
| 2,794,438 A * | 6/1957 | Heth | 460/109 |
| 3,547,129 A * | 12/1970 | Hirsch | 460/109 |
| 3,974,837 A * | 8/1976 | Applegate | 460/105 |
| 4,967,863 A * | 11/1990 | Teijido et al. | 180/53.1 |
| 5,489,239 A * | 2/1996 | Matousek et al. | 460/62 |
| 5,743,795 A * | 4/1998 | Kersting | 460/62 |
| 6,290,599 B1 | 9/2001 | Eis et al. | |
| 6,358,142 B1 * | 3/2002 | Imel et al. | 460/109 |
| 6,758,745 B2 * | 7/2004 | Van Der Haegen et al. | 460/109 |
| 7,393,274 B2 * | 7/2008 | Voss et al. | 460/109 |
| 8,133,100 B2 * | 3/2012 | Regier et al. | 460/109 |
| 8,133,101 B2 * | 3/2012 | Regier et al. | 460/109 |
| 2005/0176483 A1 * | 8/2005 | Schenk | 460/106 |
| 2005/0176484 A1 * | 8/2005 | Schenk | 460/109 |
| 2009/0233662 A1 | 9/2009 | Yanke et al. | |
| 2010/0071330 A1 * | 3/2010 | Coers et al. | 56/10.6 |

\* cited by examiner

CONSTANT PRESSURE CONCAVE ASSEMBLY IN A COMBINE HARVESTER PROCESSING SYSTEM

BACKGROUND OF THE INVENTION

1. Field of Invention

This invention relates to the crop processing systems of combine harvesters, and more particularly to a threshing concave assembly that provides a generally constant pressure on the crop passing through the processing system.

2. Description of Related Art

In one type of processing system, the crop travels axially parallel to and helically around the rotational axis of one or more rotary processing devices commonly referred to as rotors. In other systems, during at least a portion of its travel through the system the crop travels in a transverse or tangential direction relative to the rotational axis of a rotary processing device commonly referred to as a threshing cylinder. In each case, grain is processed between elements affixed to the periphery of the rotary device and arcuate, usually foraminous, stationary processing members in the form of threshing concaves or separating grates that partially wrap around the lower portion of the rotor.

Because processing systems are utilized to harvest a wide variety of different crops and must function properly in many different operating conditions, it is important to be able to conveniently and accurately adjust the running clearance in the region between the rotor and stationary processing members to best accommodate these variables. It is also known to permit the concaves to shift downward away from the rotor if a foreign object or an excessive amount of crop flow is ingested by the processing system. However, the spring forced used in such devices typically varies based on the position and amount of travel of the concaves. It would be desirable to be able to apply a more constant pressure on the crop while the rotor is operating.

OVERVIEW OF THE INVENTION

In one embodiment, the invention relates to a combine harvester having a crop processing rotor and a concave assembly having at least one concave extending at least partially beneath the rotor in a circumferential manner. The concave assembly is pivotable about pivot point to move the concave in a generally concentric manner toward and away from rotor so as to adjust the operating clearance between concave assembly and rotor. The combine harvester also has an operating mechanism configured to pivot the concave assembly to adjust the operating clearance between the concave assembly and the rotor. The operating mechanism includes an actuator and a linkage assembly connecting the actuator to the concave assembly. The linkage assembly includes a hydraulic cylinder that applies a substantially constant force to the concave assembly to control the pressure put on the crop while the rotor is rotating. A hydraulic supply ports hydraulic fluid to the hydraulic cylinder. The combine harvester also has an accumulator located between the hydraulic supply and the hydraulic cylinder.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
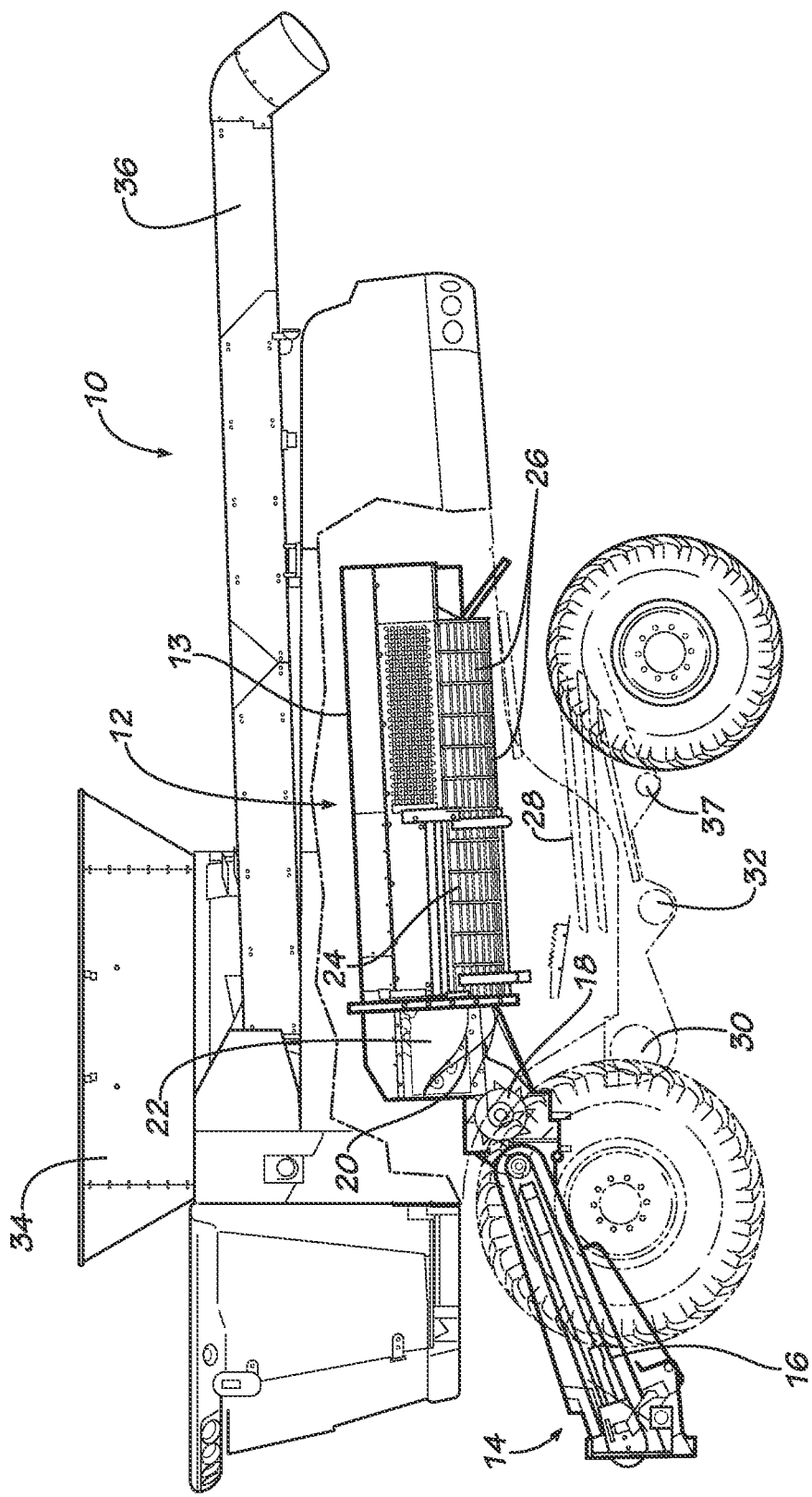
FIG. 1 is a schematic side elevation view of a combine harvester having a processing system utilizing axial flow and incorporating the principles of the present invention, portions of the harvester being broken away to reveal internal details of construction.

The exemplary combine harvester 10 selected for illustration in FIG. 1 has a single axial flow processing system 12 that extends generally parallel with the path of travel of the machine. However, as will be seen, the principles of the present invention are not limited to harvesters with processing systems designed for axial flow, nor to axial flow harvesters having only a single such processing system. However, for the sake of simplicity in explaining the principles of the present invention, this specification will proceed utilizing a single axial flow processing system as the primary example.

As well understood by those skilled in the art, in the illustrated embodiment combine harvester 10 includes a harvesting header (not shown) at the front of the machine that delivers collected crop materials to the front end of a feeder house 14. Such materials are moved upwardly and rearwardly within feeder house 14 by a conveyer 16 until reaching a beater 18 that rotates about a transverse axis. Beater 18 feeds the material upwardly and rearwardly to a rotary processing device, in this instance to a rotor 22 having an infeed auger 20 on the front end thereof. Auger 20, in turn, advances the materials axially into the processing system 12 for threshing and separating. In other types of systems, conveyor 16 may deliver the crop directly to a threshing cylinder.

Generally speaking, the crop materials entering processing system 12 move axially and helically therethrough during threshing and separating. During such travel the crop materials are threshed and separated by generally cylindrical rotor 22 operating in a generally cylindrical chamber 23 which concentrically receives the rotor 22. The lower part of the chamber 23 contains a threshing concave assembly 24 and a separator grate assembly 26. Rotation of the rotor 22 impels the crop material rearwardly in a generally helical direction about the rotor 22. A plurality of rasp bars 27 (FIG. 2) and separator bars (not shown) mounted on the cylindrical surface of the rotor 22 cooperate with the concave assembly 24 and separator grate assembly 26 to thresh and separate the crop material, with the grain escaping laterally through concave assembly 24 and separator grate assembly 26 into cleaning mechanism 28. Bulkier stalk and leaf materials are retained by the concave assembly 24 and the separator grate assembly 26 and are impelled out the rear of processing system 12 and ultimately out of the rear of the machine.

A blower 30 forms part of the cleaning mechanism 28 and provides a stream of air throughout the cleaning region below processing system 12 and directed out the rear of the machine so as to carry lighter chaff particles away from the grain as it migrates downwardly toward the bottom of the machine to a clean grain auger 32. Auger 32 delivers the clean grain to an elevator (not shown) that elevates the grain to a storage bin 34 on top of the machine, from which it is ultimately unloaded via an unloading spout 36. A returns auger 37 at the bottom of the cleaning region is operable in cooperation with other mechanism (not shown) to reintroduce partially threshed crop materials into the front of processing system 12 for an additional pass through the processing system 12.

Figure 2:
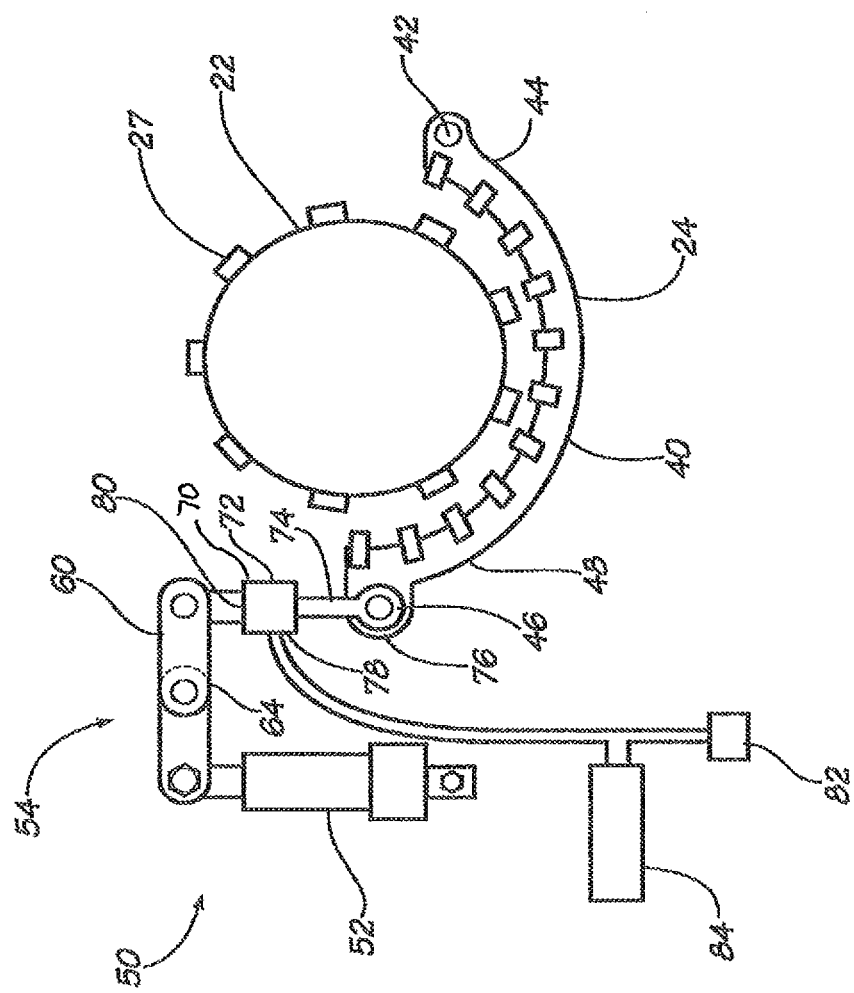
FIG. 2 is a rear elevation view of the processing system illustrating the threshing concave assembly in its fully closed position to minimize the running clearance between the rotor and the concave assembly.
Figure 3:
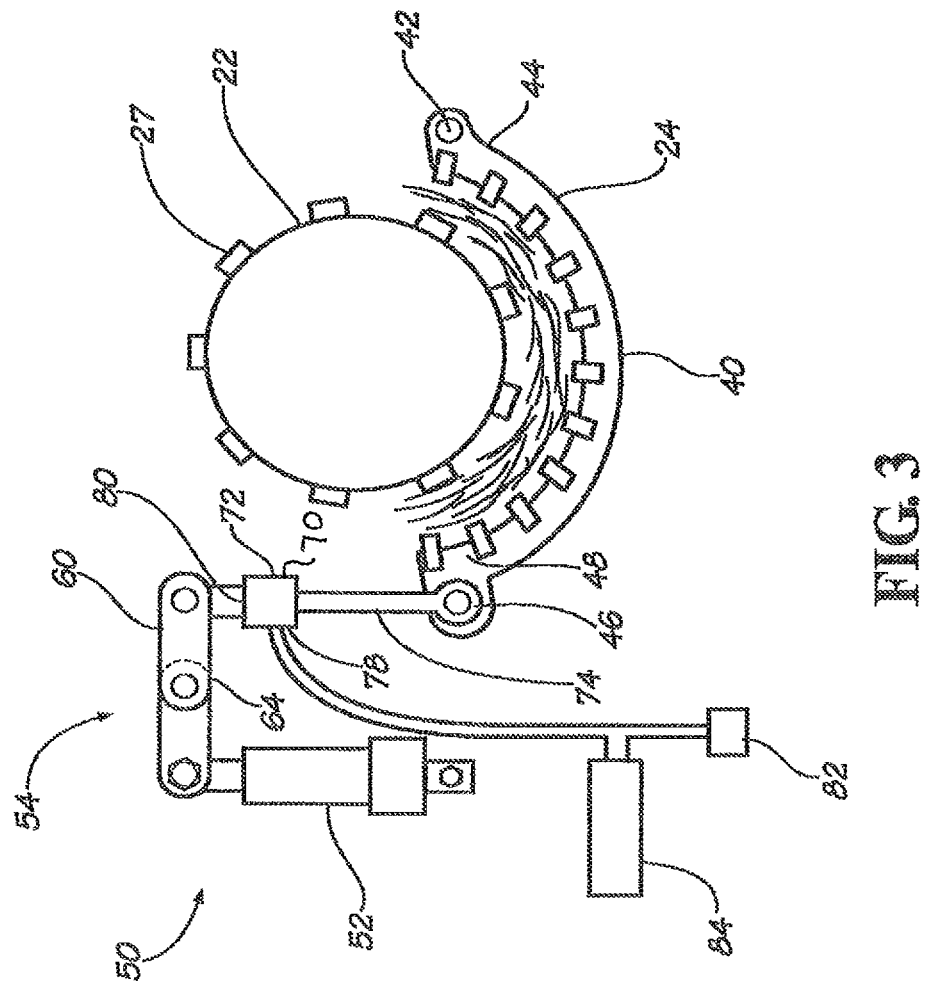
FIG. 3 is a rear elevation view of the processing system similar to FIG. 2 but illustrating the concave assembly in an open position increasing the running clearance between the rotor and the concave assembly.

As is known in the art, the concave assembly 24 is desirably made of a plurality of concaves 40 positioned axially along the forward portion of the rotor 22. As best seen in FIGS. 2 and 3, each concave 40 wraps around a bottom portion of the rotor 22 in a circumferential manner. In the illustrated embodiment of FIG. 1, the concave assembly 24 contains six substantially identical concaves 40. However, the concave assembly 24 may contain more or fewer concaves 40 without departing from the scope of the invention. Concaves 40 in the concave assembly 24 also may be arranged in side-by-side pairs with one concave 40 of each pair positioned along one side of the rotor 22 and the other concave 40 of each pair positioned on the opposite side of the rotor 22. The concave assembly 24 is adapted to pivot about pivot point 42 to move the concaves 40 toward and away from rotor 22 so as to adjust the running clearance between rotor 22 and concave assembly 24 and to change the shape of the threshing region. In the illustrated embodiment, the pivot point 42 about which the concaves 40 pivot is located at one end 44 of the concaves 40 and the concaves 40 are mounted on a common rockshaft 46 at an opposite end 48 of the concaves 40. However, one skilled in the art will understand that the rockshaft 46 may be located at other positions, such as at the bottom of the concave assembly 24, using sound engineering judgment.

An operating mechanism, broadly denoted by numeral 50, adjustably moves the concave assembly 24 toward and away from rotor 22 to adjust the position of the concave assembly 24 relative to rotor 22. The operating mechanism 50 contains an actuator 52 and a linkage assembly, broadly denoted by numeral 54, connecting the actuator 52 to the concave assembly 24. Preferably, the actuator 52 is remotely operable, such as from the cab of harvester 10. In one embodiment, the actuator 52 comprises an electrically powered linear actuator. However, one skilled in the art will understand that the actuator 52 may be selected from a number of different actuating devices known in the art, such as a hydraulic cylinder or a turnbuckle, for example. Such actuators 52 are well known to one skilled in the art and need not be described in detail herein. A control rod 58 of actuator 52 is connected pivotally at its end to the linkage assembly 54.

The linkage assembly 54 transmits the movement of the actuator 52 to the concave assembly 24. In the illustrated embodiment, the linkage assembly 54 includes a swing arm 60 and suitable bearing blocks 64 connected to the combine. However, the linkage assembly 54 may contain any means such as cranks, shafts, and other mechanisms suitable for transmitting movement initiated by the operating mechanism 50 to the concave assembly 24. The crop materials are introduced into the front end of processing system 12 and move helically within and about the rotor housing 25 in a counter-clockwise direction. The threshing action occurs in a threshing region located generally in the bottom half of the processing system 12, between the periphery of rotor 22 and concave assembly 24. In the illustrated embodiment, when actuator 52 is retracted, the linkage assembly 54 moves the concave assembly 24 inwardly toward rotor 22. When actuator 52 is extended into an open position, the concave assembly 24 is moved away from rotor 22. As the concave assembly 24 is adjusted toward an open position, the threshing region is reshaped to thereby decrease the aggressiveness of the threshing action in that area.

According to the invention, the linkage assembly 54 includes a hydraulic cylinder 70 in its connection between the actuator 52 and the concave assembly 24. The hydraulic cylinder 70 applies a substantially constant force to the concave assembly 24 to control the pressure put on the crop while the rotor 22 is operating while permitting the concave assembly 24 to shift downward away from the rotor 22 if a foreign object or an excessive amount of crop flow is ingested by the processing system 12. In the illustrated embodiment, a cylinder base 72 of the hydraulic cylinder 70 is connected to the swing arm 60 and a piston rod 74 extending from the hydraulic cylinder 70 is attached to the rock shaft 46 of the concave assembly 24. However, one skilled in the art will understand that the hydraulic cylinder 70 may connect between other portions of the linkage assembly 54 without departing from the scope of the invention. The piston rod 74 may connect to the concave assembly with any suitable mounting attachment 76 known to those skilled in the art, such as a rod-clevis or rod-eye. Desirably, the hydraulic cylinder 70 is a single acting cylinder with hydraulic fluid entering through a port 78 at one end of the cylinder 70, which then moves a piston 80 to extend the piston rod 74 and is controlled by the pressure of the hydraulic fluid ported to the cylinder 70. The hydraulic cylinder 70 may be of conventional design well understood by those skilled in the art and need not be described in greater detail herein. A hydraulic supply such as a pump 82 may be used to control the pressure of hydraulic fluid ported to the hydraulic cylinder 70. The hydraulic supply may be of conventional design and need not be described herein.

An accumulator 84 is located between the hydraulic supply 82 and the hydraulic cylinder 70. As is known in the art, the accumulator 84 may use a compressed gas, spring or other energy storing means to absorb the shock and a piston, bladder, or diaphragm to separate the energy storing means from the hydraulic fluid. The accumulator 84 is plumbed in series with the hydraulic cylinder 70 which gives the concave assembly 24 the ability to move when the concaves 40 need to move to let a large mat of crop through. The accumulator 84 permits the concave assembly 24 to open while supplying a generally constant pressure on the crop mat. Desirably, the hydraulic supply 82 may be selectively controlled from the cab of the combine 10 during operations to make changes to the concave pressure put on the crop by the concave assembly 24 while the combine harvester 10 is operating.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A combine harvester having a crop processing rotor, comprising:
   a concave assembly having at least one concave extending at least partially beneath the rotor in a circumferential manner and pivotable about pivot point to move the concave in a generally concentric manner toward and away from rotor so as to adjust the operating clearance between concave assembly and rotor;
   an operating mechanism configured to pivot the concave assembly to adjust the operating clearance between the concave assembly and the rotor, the operating mechanism comprising an actuator and a linkage assembly connecting the actuator to the concave assembly, wherein the actuator is selectively positionable to adjust the position of the concave relative the rotor, and wherein the linkage assembly comprises a hydraulic cylinder that applies a substantially constant force to the concave assembly to control pressure put on the crop;
   a hydraulic supply porting hydraulic fluid to the hydraulic cylinder; and
   an accumulator located in series between the hydraulic supply and the hydraulic cylinder.

2. The combine harvester of claim 1 comprising a plurality of concaves which are mounted on a common rockshaft one end of the plurality of concaves.

3. The combine harvester of claim 2 wherein the concaves pivot about the pivot point which is located at an opposite end of the concaves.

4. The combine harvester of claim 3 wherein a piston rod extending from the hydraulic cylinder is attached to the rock shaft of the concave assembly.

5. The combine harvester of claim 3 wherein the linkage assembly includes a pivotable swing arm, wherein the actuator is connected to a first end of the swing arm and the hydraulic cylinder is connected between a second end of the swing arm and the rock shaft.

* * * * *